United States Patent
Eun et al.

(10) Patent No.: US 7,518,693 B2
(45) Date of Patent: Apr. 14, 2009

(54) LIQUID CRYSTAL DISPLAY DEVICE AND METHOD FOR MANUFACTURING THE SAME

(75) Inventors: Chong Chan Eun, Paju-si (KR); Jun Young Yu, Paju-si (KR); Tae Man Kim, Paju-si (KR); Hong Seok Lee, Paju-si (KR); Jun Beom Cho, Anseong-si (KR)

(73) Assignee: LG Display Co., Ltd., Seoul (KR)

( * ) Notice: Subject to any disclaimer, the term of this patent is extended or adjusted under 35 U.S.C. 154(b) by 302 days.

(21) Appl. No.: 11/477,801

(22) Filed: Jun. 30, 2006

(65) Prior Publication Data
US 2007/0070288 A1  Mar. 29, 2007

(30) Foreign Application Priority Data
Sep. 28, 2005  (KR)  ............... 10-2005-0090637
Dec. 23, 2005  (KR)  ............... 10-2005-0128651

(51) Int. Cl.
*G02F 1/1339* (2006.01)
*G02F 1/13* (2006.01)

(52) U.S. Cl. ............ 349/153; 349/154; 349/187
(58) Field of Classification Search ........... 349/153, 349/154
See application file for complete search history.

(56) References Cited

U.S. PATENT DOCUMENTS

| 5,583,671 | A  | * | 12/1996 | Yoshida et al. ........ 349/93 |
| 7,075,611 | B2 | * | 7/2006  | Jung et al. .......... 349/153 |
| 2005/0001974 | A1 | | 1/2005  | Iida et al. |
| 2005/0200800 | A1 | * | 9/2005  | Makimoto et al. ..... 349/187 |

FOREIGN PATENT DOCUMENTS

| GB | 2142 735 A   | 1/1985  |
| JP | 57188019 A   | 11/1982 |
| JP | 2002040443 A | 2/2002  |

* cited by examiner

*Primary Examiner*—Michelle R Connelly Cushwa
(74) *Attorney, Agent, or Firm*—McKenna Long & Aldridge LLP (57) ABSTRACT

An LCD device and a method for manufacturing the same is disclosed, in which it is possible to correct a problem of insufficient or excessive supply of liquid crystal in an LCD device by controlling an amount of liquid crystal, the method comprising preparing a liquid crystal cell comprised of a first substrate, a second substrate, a liquid crystal layer between the first and second substrates, and a first sealant formed in the periphery of the liquid crystal layer between the first and second substrates; measuring an amount of liquid crystal provided to the inside of liquid crystal cell; forming an inlet for liquid crystal in the first sealant; regulating the amount of liquid crystal by supplying or discharging the liquid crystal through the inlet; and sealing the inlet.

16 Claims, 6 Drawing Sheets

LIQUID CRYSTAL DISPLAY DEVICE AND METHOD FOR MANUFACTURING THE SAME

This application claims the benefit of the Korean Patent Application Nos. P2005-90637 filed on Sep. 28, 2005 and P2005-128651 filed on Dec. 23, 2005, which are hereby incorporated by reference for all purposes as if fully set forth herein. This application incorporates by reference co-pending application Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application, Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to a liquid crystal display (LCD) device, and more particularly, to a method for controlling an amount of liquid crystal in an LCD device manufactured by a liquid crystal dispensing method.

2. Discussion of the Related Art

Among various ultra-thin flat type display devices, which include a display screen having a thickness of several centimeters, a liquid crystal display (LCD) device can be widely used in notebook computers, monitors, aircraft, and etc. since it has advantages such as low power consumption and portability.

Hereinafter, an LCD device according to the related art will be explained as follows.

Figure 1:
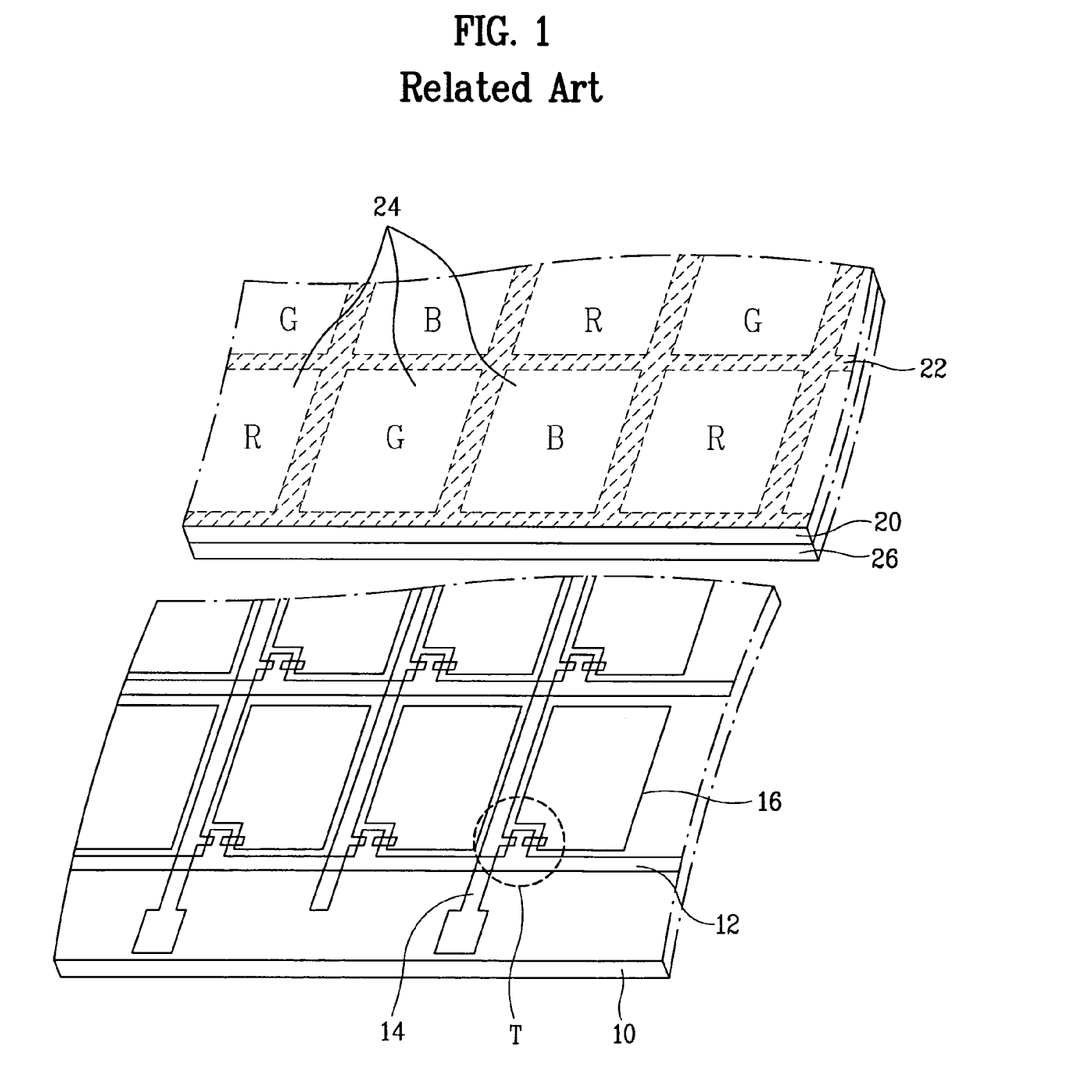
FIG. 1 illustrates an exploded perspective view of an LCD device according to the related art.

FIG. 1 illustrates an exploded perspective view of an LCD device according to the related art.

As shown in FIG. 1, an LCD device according to the related art includes a lower substrate 10, an upper substrate 20, and a liquid crystal layer (not shown) formed between the lower and upper substrates 10 and 20.

The lower substrate 10 includes gate and data lines 12 and 14 crossing each other to define a unit pixel region. Then, a thin film transistor TFT is formed adjacent to a crossing portion of the gate and data lines 12 and 14, wherein the thin film transistors TFT functions as a switch. Also, a pixel electrode 16 is formed in the pixel region, wherein the pixel electrode 16 is connected with the thin film transistor TFT.

The upper substrate 20 includes a black matrix layer 22 for preventing light leakage from other portions except the pixel region, a color filter layer 24 of red, green and blue patterns for representing colors in the portion corresponding to the pixel region, and a common electrode 26 formed on the color filter layer 24.

The LCD device is manufactured in steps including preparing the lower and upper substrates, and forming the liquid crystal layer between the lower and upper substrates. The liquid crystal layer may typically be formed using a dispensing method or a vacuum injection method.

In the vacuum injection method, a sealant having an inlet is formed in any one of the two substrates, and the two substrates are bonded to each other, and then liquid crystal is injected to a space between the two substrates.

In the dispensing method, a sealant having no inlet is formed in the lower substrate, and then liquid crystal is dispensed on the lower substrate. The two substrates are then bonded to each other.

As substrates increase in size, the vacuum injection method becomes problematic because it requires a long injection time, thereby lowering the production yield. Because of this, the large-sized LCD device generally uses the dispensing method.

However, the dispensing method of liquid crystal according to the related art has following disadvantages.

In the dispensing method of liquid crystal according to the related art, it is difficult to control an appropriate amount of liquid crystal.

Unlike the vacuum injection method, the dispensing method measures the appropriate amount of liquid crystal taking into consideration the size and height of cell. However, it is difficult to accurately control the amount of liquid crystal because of various environmental restrictions.

If the amount of liquid crystal is insufficient, the inside of an LCD panel is provided with incompletely-filled portions. Meanwhile, if the amount of liquid crystal is excessive, the inside of an LCD panel is provided with excessively-filled portions. As a result, a picture quality of displayed image is deteriorated.

Accordingly, extensive study and research have been made so as to prevent the liquid crystal from being provided insufficiently or excessively. If insufficiently or excessively dispensing the liquid crystal to the LCD panel, the LCD panel will have serious defects. Thus, even though it is costly and inefficient, LCD panels having insufficient or excessive liquid crystal are scrapped.

SUMMARY OF THE INVENTION

Accordingly, the present invention is directed to a method for manufacturing an LCD device, which substantially obviates one or more problems due to limitations and disadvantages of the related art.

An object of the present invention is to provide a method for manufacturing an LCD device, in which it is possible to correct a problem of insufficient or excessive supply of liquid crystal in an LCD device by controlling an amount of liquid crystal dispensed.

Another object of the present invention is to provide an LCD device, in which it is possible to correct a problem of insufficient or excessive supply of liquid crystal in an LCD device by controlling an amount of liquid crystal dispensed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing an LCD device comprises preparing a liquid crystal cell comprised of a first substrate, a second substrate, a liquid crystal layer between the first and second substrates, and a first sealant formed in the periphery of the liquid crystal layer between the first and second substrates; measuring an amount of liquid crystal provided to the inside of liquid crystal cell; forming an inlet for liquid crystal in the first sealant; regulating the amount of liquid crystal by supplying or discharging the liquid crystal through the inlet; and sealing the inlet.

Even though the liquid crystal is provided insufficiently or excessively to the LCD panel, the inlet is formed in the sealant. Thus, it is possible to regulate the amount of liquid crystal by supplying or discharging the liquid crystal through the inlet of the sealant.

At this time, the process for forming the inlet for liquid crystal in the first sealant comprises removing a predetermined portion of the first sealant by applying laser. The process of removing the predetermined portion of the first sealant by laser comprises completely removing the predetermined portion of the first sealant. Alternatively, the process of removing the predetermined portion of the first sealant by laser comprises partially removing the predetermined portion of the first sealant.

In addition, the process of regulating the amount of liquid crystal comprises discharging a small amount of liquid crystal to the outside of liquid crystal cell through the inlet when the liquid crystal is provided excessively. In addition, the process of discharging the excessive liquid crystal comprises applying a pressure to the liquid crystal cell.

Meanwhile, the process of regulating the amount of liquid crystal comprises supplying a small amount of liquid crystal to the inside of liquid crystal cell through the inlet when the liquid crystal is provided insufficiently.

Also, the process of sealing the inlet comprises providing a second sealant to the inlet of the first sealant, and curing the second sealant. At this time, the first and second sealants are formed of the same material.

In another aspect of the present invention, an LCD device comprises first and second substrates; a liquid crystal layer formed between the first and second substrates; a first sealant, having an inlet for liquid crystal, formed in the periphery of the liquid crystal layer between the first and second substrates; and a second sealant for sealing the inlet of the first sealant.

At this time, the inlet for liquid crystal is formed by completely removing a predetermined portion of the first sealant. Also, the inlet for liquid crystal is formed by partially removing a predetermined portion of the first sealant, so as to leave some of the first sealant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Hereinafter, a method for manufacturing an LCD device according to the present invention will be described with reference to the accompanying drawings.

FIGS. 2A to 2D illustrate schematic views of a method for manufacturing an LCD device according to one preferred embodiment of the present invention. In each of FIGS. 2A to 2D, the left side shows the plan view of the LCD device, and the right side shows the cross sectional view along I-I'.

Figure 2A:
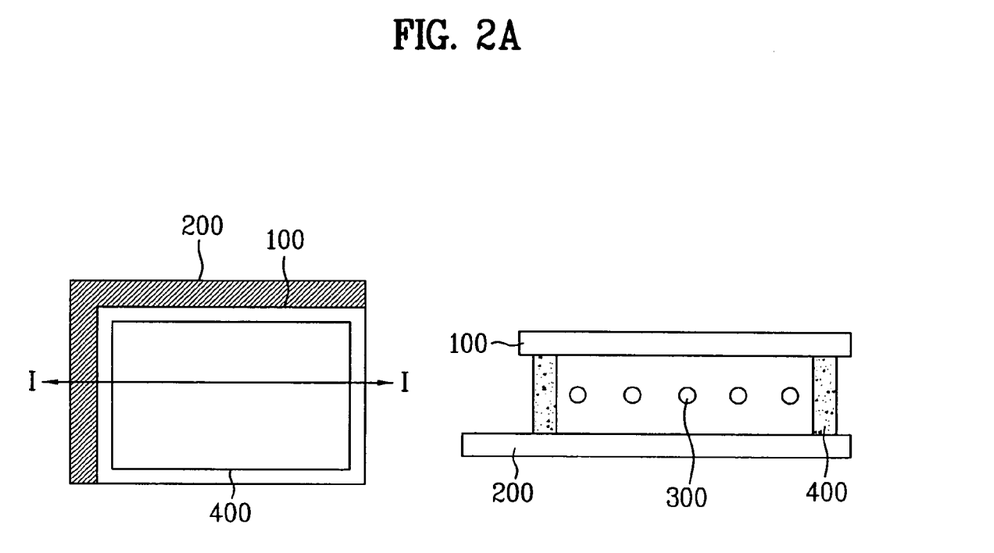
FIGS. 2A to 2D illustrate schematic views of a method for manufacturing an LCD device according to one preferred embodiment of the present invention.

First, as shown in FIG. 2A, the LCD device according to the present invention includes a liquid crystal cell comprised of a first substrate 100, a second substrate 200, a liquid crystal layer 300 formed between the first and second substrates 100 and 200, and a first sealant 400 for surrounding the liquid crystal layer 300 between the first and second substrates 100 and 200.

The process of preparing the liquid crystal cell includes steps of preparing the first substrate 100, preparing the second substrate 200, and forming the liquid crystal layer 300 between the first and second substrates 100 and 200.

Although not shown, the process of preparing the first substrate 100 includes steps of forming a black matrix layer for prevention of light leakage on a transparent substrate, forming a color filter layer between each pattern of the black matrix layer, and forming a common electrode on the color filter layer.

If applying an In-Plane Switching (IPS) mode, the common electrode is formed in parallel to a pixel electrode on the second substrate 200.

Although not shown, the process of preparing the second substrate 200 includes steps of forming gate and data lines crossing each other to define a unit pixel region, forming a thin film transistor of a switch adjacent to a crossing portion of the gate and data lines, and forming the pixel electrode electrically connected with the thin film transistor and formed in the pixel region.

At this time, a gate pad is formed at one end of the gate line, and a data pad is formed at one end of the data line, wherein the gate and data lines are connected with a driving circuit by the gate and data pads.

The second substrate 200 is slightly larger than the first substrate 100 since the gate and data pads are formed on the second substrate 200. That is, the gate and data pads are formed in portion corresponding to slant lines of the left drawing of FIG. 2A.

In the process of forming the liquid crystal layer 300 between the first and second substrates 100 and 200, a liquid crystal dispensing method is used.

That is, the first sealant 400 is formed on either of the first and second substrates 100 and 200, and a predetermined amount of liquid crystal is dispensed on either of the first and second substrates 100 and 200. Then, the first and second substrates 100 and 200 are bonded to each other.

The components and formation steps in the above process for preparing the liquid crystal cell may be changeable in various methods generally known to those skilled in the art.

After that, a step for measuring the amount of liquid crystal 300 within the liquid crystal cell is performed by the naked eye. This step can be performed in various methods generally known to those skilled in the art.

If the amount of liquid crystal dispensed is not correct (that is, the liquid crystal is insufficiently or excessively dispensed), a step for regulating the amount of liquid crystal is performed as follows.

Figure 2B:
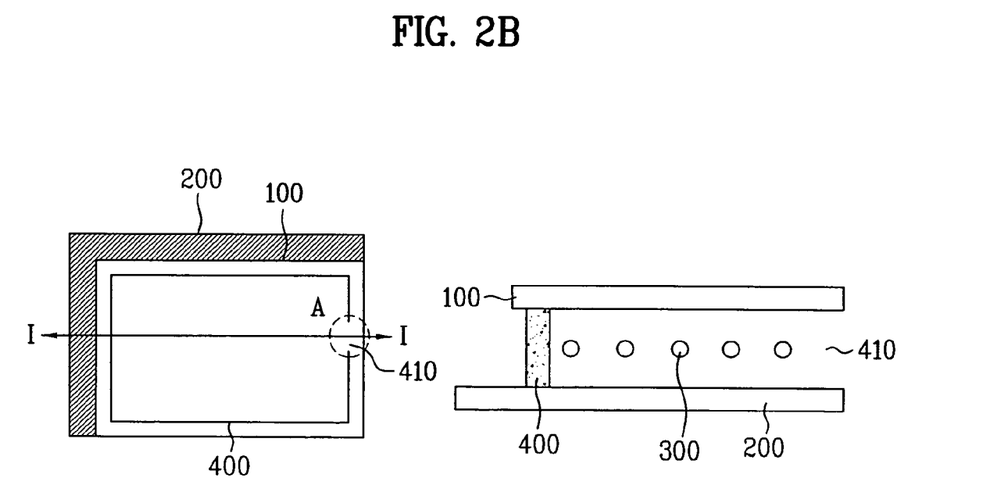

If dispensing liquid crystal insufficiently or excessively, as shown in FIG. 2B, an inlet or hole 410 for liquid crystal to pass through is formed in a predetermined portion (A) of the first sealant 400. By applying laser to the predetermined portion (A) of the first sealant 400, the first sealant 400 is removed from the predetermined portion (A), thereby forming the inlet 410. Accordingly, it is possible to regulate the amount of liquid crystal through the inlet 410 of liquid crystal.

The process of removing the first sealant by applying laser may be comprised of completely removing the predetermined portion of the first sealant, or may be comprised of partially removing the predetermined portion of the first sealant. If partially removing the predetermined portion of the first sealant, some first sealant may be left at a predetermined interval from the first or second substrate 100 or 200. In another aspect, the first sealant may be formed between the first and second substrates 100 and 200 in a closed shape having a width to be opened by the liquid crystal with the pressure.

Figure 3A:
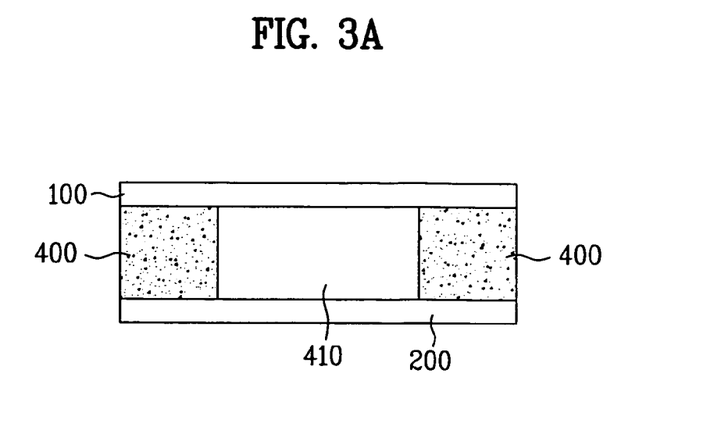
FIGS. 3A and 3B illustrate cross sectional views of 'A' along the line perpendicular to I-I' line of FIG. 2B.
Figure 3B:
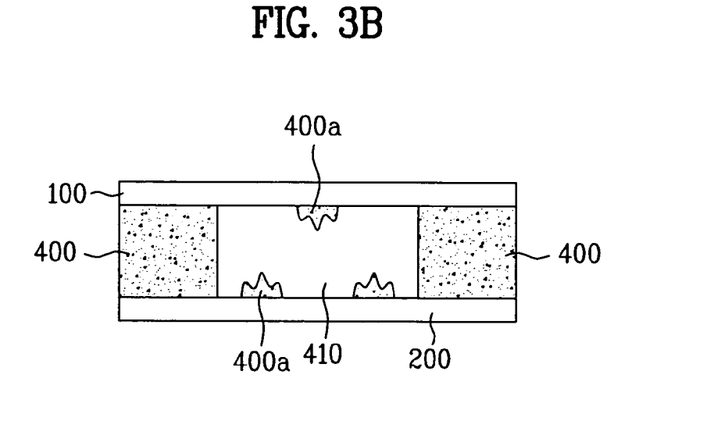
Figure 3C:
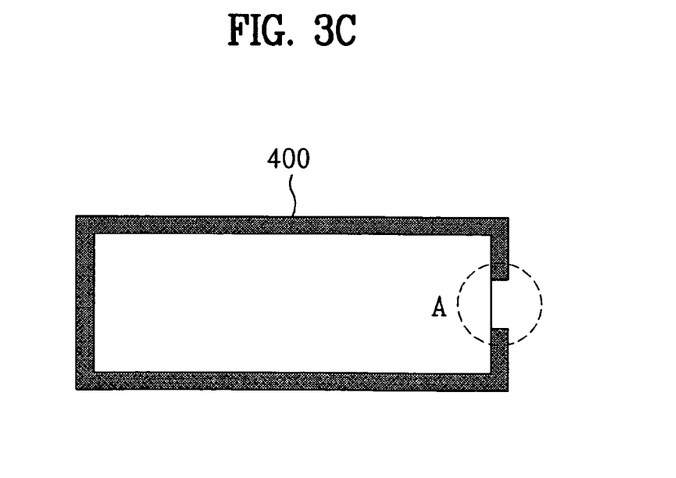
FIG. 3C illustrates an expanded view of a first sealant of FIG. 2B.

The shape of the first sealant in the predetermined portion removed by the laser may be various, as shown in FIGS. 3A to 3C.

FIG. 3A illustrates a cross sectional view of 'A' of the first sealant along the line perpendicular to I-I' line of FIG. 2B, wherein the first sealant of the predetermined portion is completely removed.

FIG. 3B illustrates a cross sectional view of 'A' of the first sealant along the line perpendicular to I-I' of FIG. 2B, wherein the first sealant of the predetermined portion is partially removed, and some first sealant 400a is formed at a predetermined interval from the first or second substrate 100 or 200.

FIG. 3C illustrates an exploded view of the first sealant 400 from FIG. 2B. In FIG. 3C, the first sealant 400 is formed in the closed shape, wherein the predetermined portion of the first sealant is smaller in width than the other portions of the first sealant by applying of laser. That is, when the pressure is applied to the predetermined portion of the first sealant, the predetermined portion of the first sealant is opened due to the small width.

Referring to FIGS. 3A and 3B, as removing the predetermined portion of the first sealant 400, an opening for the liquid crystal is formed therein, whereby the liquid crystal is discharged through the opening. When discharging the liquid crystal, bubbles may be generated.

As shown in FIG. 3C, instead of forming the opening in the predetermined portion of the first sealant 400, the predetermined portion of the first sealant 400 has a closed shape of decreased width. That is, when the pressure is applied to the predetermined portion of the first sealant 400, the predetermined portion of the first sealant 400 is opened by the liquid crystal because of the decreased width of the first sealant 400. In this case, it is possible to prevent a bubble from being generated when discharging the liquid crystal.

If the first sealant 400 is formed in the closed shape of FIG. 3C, it is possible to prevent the inside of liquid crystal cell from contacting with the external air or moisture. At this time, preferably, the width of the first sealant of the predetermined portion is formed between 0.25 mm and 0.6 mm, so as to prevent the bubble from being generated when discharging the liquid crystal through the predetermined portion of the first sealant.

The inlet 410 for liquid crystal, formed in the first sealant 400, is provided at least one side of the liquid crystal cell having no gate and data pads (slant lines), so as to minimize the bad effects applied to the pads when regulating the amount of liquid crystal in the following step.

Figure 2C:
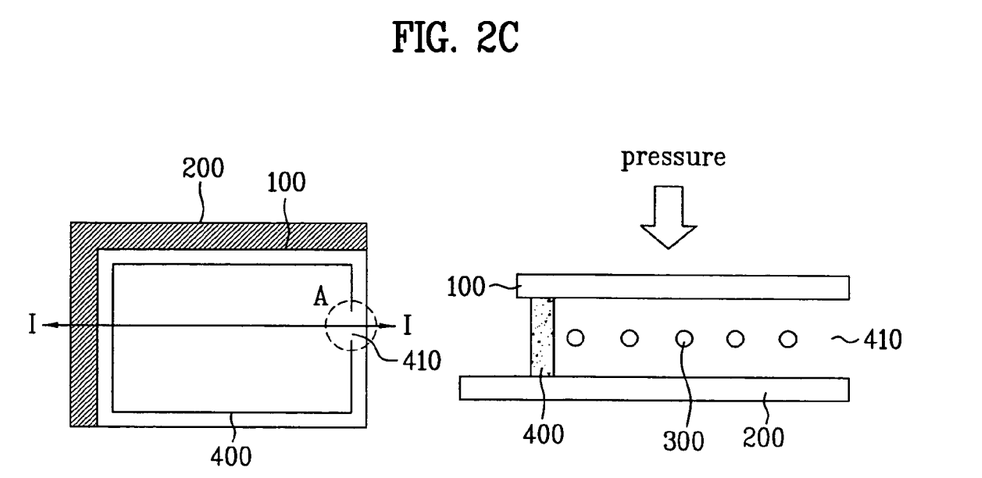

After that, as the pressure is applied to the liquid crystal cell as shown in FIG. 2C, the liquid crystal is discharged outside of liquid crystal cell.

FIG. 2C illustrates the case the liquid crystal is provided excessively. If the liquid crystal is provided insufficiently, a small amount of liquid crystal is provided to the inside of liquid crystal cell through the inlet 410.

The amount of liquid crystal discharged to the outside of liquid crystal cell depends on the pressure applied to the liquid crystal cell. Thus, the pressure is selectively applied to the liquid crystal cell according to the amount of liquid crystal provided excessively.

Figure 2D:
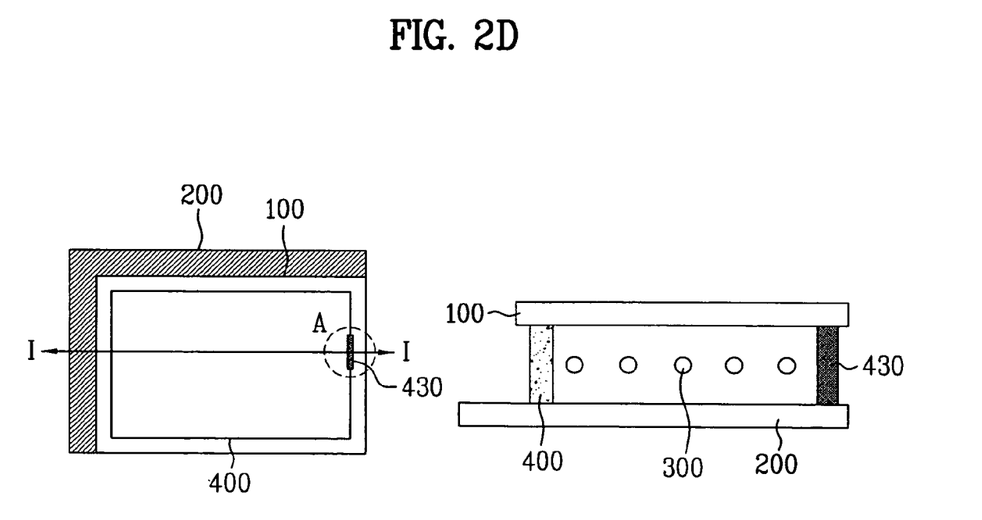

After that, as shown in FIG. 2D, the inlet 410 is sealed.

The process of sealing the inlet 410 may include steps of providing a second sealant 430 to the inlet 410 of the first sealant 400, and curing the second sealant 430.

If using the second sealant 430 of UV-curing type, the process of curing the second sealant 430 is performed by applying UV rays.

The second sealant 430 and the first sealant 400 are formed of the same material.

Hereinafter, an LCD device according to the present invention will be described as follows.

Figure 4:
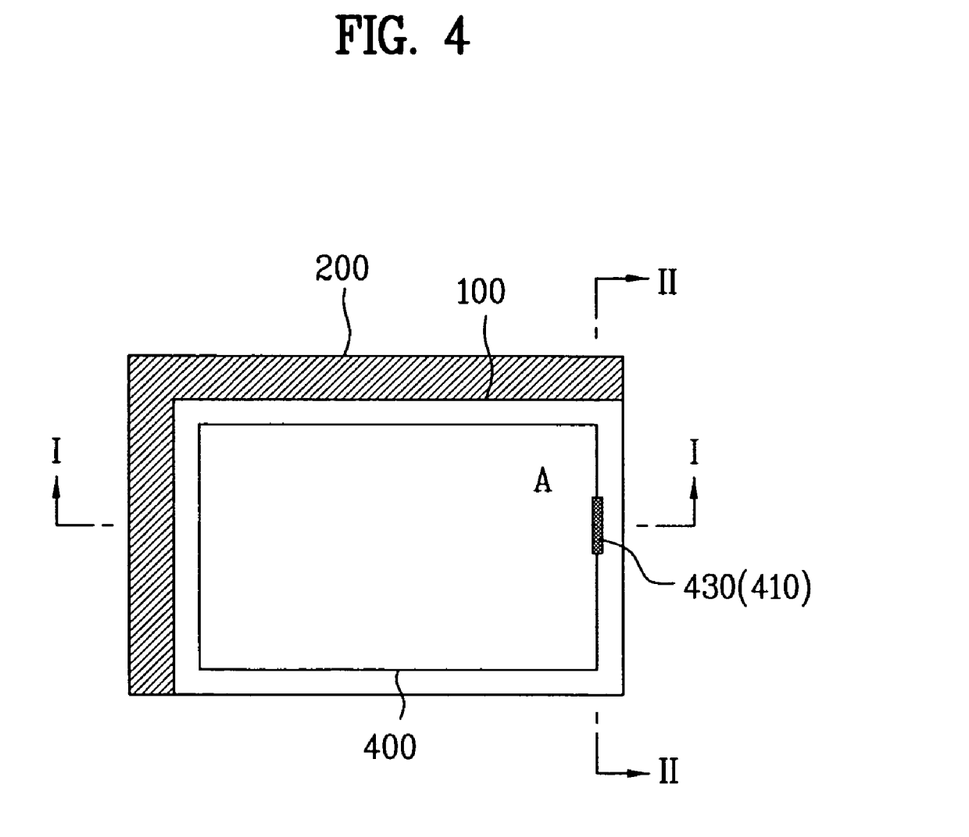
FIG. 4 illustrates a plane view of an LCD device in which an amount of liquid crystal is controlled according to one preferred embodiment of the present invention.
Figure 5A:
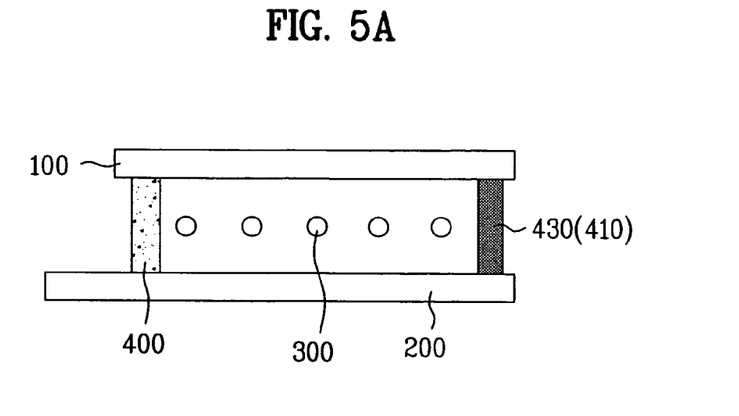
FIG. 5A illustrates an LCD device along I-I' of FIG. 4.
Figure 5B:
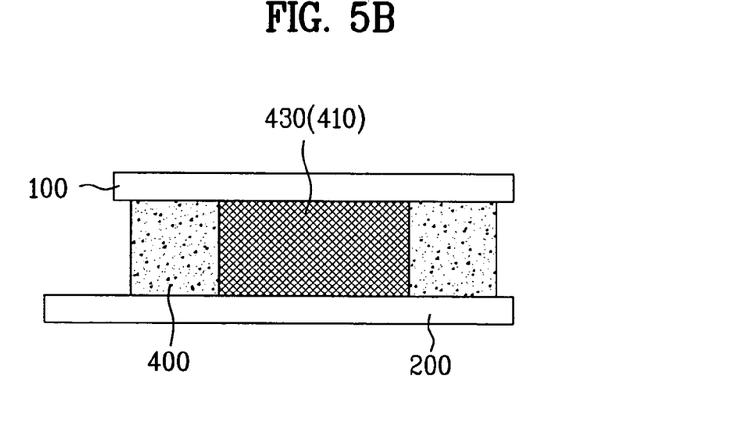
FIGS. 5B and 5C illustrate cross sectional views of various LCD devices along II-II' of FIG. 4.
Figure 5C:
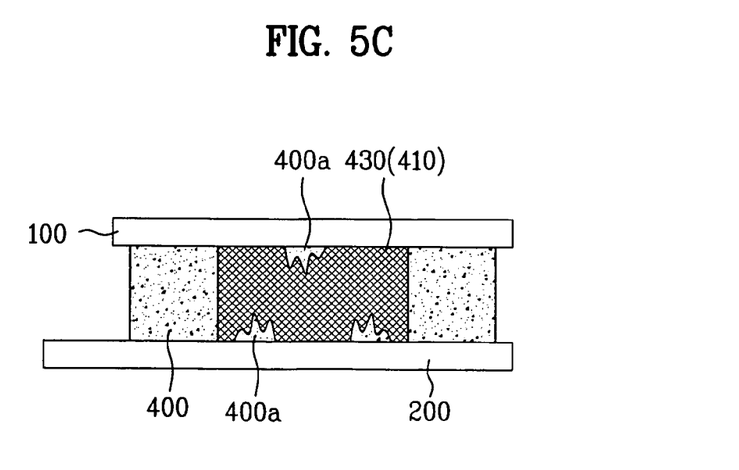

FIG. 4 illustrates a plane view of an LCD device in which an amount of liquid crystal is controlled according to one preferred embodiment of the present invention. FIG. 5A illustrates a cross sectional view of an LCD device along I-I' of FIG. 4. FIGS. 5B and 5C illustrate cross sectional views of various LCD devices along II-II' of FIG. 4.

As shown in FIGS. 4 and 5A, an LCD device according to one preferred embodiment of the present invention includes a first substrate 100, a second substrate 200, a liquid crystal layer 300 formed between the first and second substrates 100 and 200, a first sealant 400, formed in the periphery of the liquid crystal layer 300 between the first and second substrates 100 and 200, having an inlet 410 for providing or discharging liquid crystal therethrough, and a second sealant 430 for sealing the inlet 410 of the first sealant 400.

Although not shown, the first substrate 100 includes a black matrix layer for preventing light leakage, a color filter layer formed between each pattern of the black matrix layer, and a common electrode formed on the color filter layer.

Although not shown, the second substrate 200 includes gate and data lines crossing each other to define a unit pixel region, a gate pad formed at one end of the gate line, and a data pad formed at one end of the data line. The gate and data pads correspond to slant lines of FIG. 4.

In addition, a thin film transistor is formed adjacent to a crossing portion of the gate and data lines, wherein the thin film transistor functions as a switch. Also, a pixel electrode is formed in the pixel region, and is electrically connected with the thin film transistor.

Also, an inlet 410 for supplying or discharging liquid crystal may be formed by completely removing a predetermined portion of the first sealant 400 as shown in FIG. 5B, or may be formed by partially removing a predetermined portion of the first sealant 400 as shown in FIG. 5C. In FIG. 5C, as partially removing the predetermined portion of the first sealant 400, some first sealant 400a is formed at a predetermined interval from the first or second substrate 100 or 200.

Although not shown, the inlet 410 for liquid crystal is formed with the first sealant 400 being left in the predetermined portion. As explained in FIG. 3C, the inlet 410 may be formed according as some of the first sealant having a predetermined width is opened by the liquid crystal inside the liquid crystal cell. Preferably, the width of the first sealant of the predetermined portion is formed between 0.25 mm and 0.6 mm.

Preferably, the inlet 410 for liquid crystal is provided at least one side (the side corresponding to the other portions except slant lines in FIG. 4) of the liquid crystal cell having no gate and data pads.

The first and second sealants 400 and 430 may be formed of the same material.

As mentioned above, the LCD device according to the present invention has the following advantages.

Even though the liquid crystal is provided insufficiently or excessively to the LCD panel, the inlet is formed in the sealant. Thus, it is possible to regulate the amount of liquid crystal by supplying or discharging the liquid crystal through the inlet of the sealant.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an LCD device comprising:
   preparing a liquid crystal cell comprised of a first substrate, a second substrate, a liquid crystal layer between the first and second substrates, and a first sealant formed in the periphery of the liquid crystal layer between the first and second substrates;
   measuring an amount of liquid crystal provided to the inside of liquid crystal cell;
   forming an inlet for liquid crystal in the first sealant by partially removing a predetermined portion of the first sealant, by applying laser;
   regulating the amount of liquid crystal in the cell by discharging the liquid crystal through the inlet; and
   sealing the inlet,
   wherein a remaining first sealant is formed in the predetermined portion of the first sealant, and the remaining first sealant is formed in a closed shape having a width to be opened by the liquid crystal supplied with a pressure.

2. The method of claim 1, wherein the remaining first sealant is formed at a predetermined interval from the first or second substrate.

3. The method of claim 1, wherein the width of the remaining first sealant is formed between approximately 0.25 mm and 0.6 mm.

4. The method of claim 1, wherein the process of preparing the liquid crystal cell comprises forming gate and data pads on the second substrate, and the process of forming the inlet for liquid crystal in the first sealant comprises forming the inlet at least any one side of the liquid crystal cell having no gate and data pads.

5. The method of claim 1, wherein the process of regulating the amount of liquid crystal comprises discharging a small amount of liquid crystal to the outside of liquid crystal cell through the inlet when the liquid crystal is provided excessively.

6. The method of claim 5, wherein the process of discharging the excessive liquid crystal comprises applying pressure to the liquid crystal cell.

7. The method of claim 1, wherein the process of regulating the amount of liquid crystal comprises supplying a small amount of liquid crystal to the inside of liquid crystal cell through the inlet when the liquid crystal is provided insufficiently.

8. The method of claim 1, wherein the process of sealing the inlet comprises providing a second sealant to the inlet of the first sealant, and curing the second sealant.

9. The method of claim 8, wherein the first and second sealants are formed of the same material.

10. The method of claim 1, wherein the process of measuring the amount of liquid crystal provided to the inside of liquid crystal cell is performed by the naked eye.

11. The method of claim 1, wherein the process of preparing the liquid crystal cell comprises:
    preparing the first and second substrates;
    forming the first sealant on one of the first and second substrates;
    dispensing the liquid crystal on to one of the first and second substrates;
    bonding the first and second substrates to each other.

12. An LCD device comprising:
    first and second substrates;
    a liquid crystal layer formed between the first and second substrates;
    a first sealant, having an inlet for liquid crystal, formed in the periphery of the liquid crystal layer between the first and second substrates, wherein the inlet for liquid crystal is formed by partially removing a predetermined portion of the first sealant and leaving some of the first sealant; and
    a second sealant for sealing the inlet of the first sealant,
    wherein some of a remaining first sealant is formed between the first and second substrate in the predetermined portion of the first sealant, and is formed in a closed shape having a width to be opened by the liquid crystal supplied with a pressure.

13. The LCD device of claim 12, wherein the remaining first sealant is formed at a predetermined interval from the first or second substrate.

14. The LCD device of claim 12, wherein the width of the remaining first sealant is formed between 0.25 mm and 0.6 mm.

15. The LCD device of claim 12, wherein the first and second sealants are formed of the same material.

16. The LCD device of claim 12, wherein the first substrate includes gate and data pads, and the inlet for liquid crystal is formed at least any one side of the liquid crystal cell having no gate and data pads.

* * * * *